United States Patent
Vandervate et al.

(10) Patent No.: US 12,006,993 B2
(45) Date of Patent: Jun. 11, 2024

(54) PROCESS FOR ASSEMBLING VEHICLE BRAKE SHOES AND ASSOCIATED BRAKE SHOE

(71) Applicant: MAT HD, LLC, Long Grove, IL (US)

(72) Inventors: Ryle Vandervate, Jacksonville, AR (US); Jacob Hill, Centre, AL (US); Jason Townsel, Rome, GA (US); Billy Joe Smith, Aragon, GA (US)

(73) Assignee: MAT HD, LLC, Long Grove, IL (US)

( * ) Notice: Subject to any disclaimer, the term of this patent is extended or adjusted under 35 U.S.C. 154(b) by 201 days.

(21) Appl. No.: 17/805,587

(22) Filed: Jun. 6, 2022

(65) Prior Publication Data
US 2023/0392661 A1 Dec. 7, 2023

(51) Int. Cl.
*F16D 69/04* (2006.01)
(52) U.S. Cl.
CPC .. *F16D 69/0416* (2013.01); *F16D 2069/0433* (2013.01); *F16D 2069/0475* (2013.01); *F16D 2069/0483* (2013.01)
(58) Field of Classification Search
CPC .. F16D 69/04; F16D 69/0425; F16D 69/0433; F16D 69/0466; F16D 69/0475; F16D 2069/0433; F16D 2069/0475; F16D 2069/0483
See application file for complete search history.

(56) References Cited

U.S. PATENT DOCUMENTS

| | | | | |
|---|---|---|---|---|
| 2,581,926 A * | 1/1952 | Groten | ................. | F16D 69/021 156/335 |
| 3,918,555 A * | 11/1975 | Rath | ................. | F16D 65/0006 188/205 A |
| 3,956,548 A * | 5/1976 | Kovac | ................. | C04B 35/83 188/73.1 |
| 5,261,512 A | 11/1993 | Young | | |
| 5,480,008 A * | 1/1996 | Hummel | ................. | F16D 65/092 188/250 G |
| 5,791,443 A * | 8/1998 | Manz | ................. | F16D 69/0416 188/264 G |
| 5,809,627 A * | 9/1998 | Baldwin | ................. | F16D 65/08 29/469.5 |
| 6,748,643 B2 * | 6/2004 | Yamane | ................. | B05D 7/14 427/292 |
| 8,800,728 B2 * | 8/2014 | Dharaiya | ................. | F16D 65/08 188/264 G |
| 9,360,067 B1 * | 6/2016 | Arbesman | ................. | F16D 69/04 |
| 11,536,335 B2 * | 12/2022 | Foster | ................. | F16D 65/092 |
| 2003/0097754 A1 * | 5/2003 | Yamane | ................. | B05D 7/14 29/898 |

(Continued)

*Primary Examiner* — Thomas W Irvin
(74) *Attorney, Agent, or Firm* — Greer, Burns & Crain, Ltd

(57) ABSTRACT

A process for assembling vehicle brake shoes, includes providing a painted vehicle brake shoe with a table constructed and arranged for receiving a brake friction liner; applying a layer of self-adhesive material to the brake shoe table; subjecting the brake shoe and layer of material to heat sufficient in intensity and duration to thermally bond the self-adhesive material to the brake shoe table; removing a release layer from an external surface of the layer of self-adhesive material; applying a brake lining to the combined brake shoe and self-adhesive material; and fastening the brake lining to the brake shoe.

9 Claims, 5 Drawing Sheets

(56) References Cited

U.S. PATENT DOCUMENTS

| | | | |
|---|---|---|---|
| 2012/0228070 A1* | 9/2012 | Dharaiya | F16D 65/08 29/458 |
| 2013/0175127 A1* | 7/2013 | MacKelvie | F16D 65/092 188/250 B |
| 2023/0140297 A1* | 5/2023 | Cho | B29C 43/52 264/250 |

* cited by examiner

PROCESS FOR ASSEMBLING VEHICLE BRAKE SHOES AND ASSOCIATED BRAKE SHOE

BACKGROUND

The present invention relates generally to brake shoes typically associated with vehicle drum brakes of the type used on commercial trucks and similar vehicles, and more specifically to a method of assembling brake shoes using a sealing liner.

Large commercial utility vehicles including but not limited to emergency vehicles, construction trucks, semi tractors and trailers and the like typically are equipped with drum-type brakes having brake shoes. As is known in the art, such brakes are manufactured to withstand extreme heat and stresses. In addition, these brakes are exposed to the elements and are vulnerable to moisture-based corrosion. Extreme cases of corrosion can lead to brake malfunctions and/or premature removal and replacement of brake components.

U.S. Pat. No. 5,261,512, the contents of which are incorporated by reference, disclosed one attempt at solving the problem of brake shoe corrosion. An adhesive sheet is disclosed as being located between a table or mounting surface of the brake shoe and the friction liner that provides the stopping action as it is pressed against the circular brake drum surface. In the '512 patent, the adhesive sheet forms a sealing layer between the friction liner and the brake shoe for retarding the progression of moisture to the brake shoe. As such, some progress in retarding corrosion of the brake shoe table was achieved. However, in practice, the sealing layer has been found to break down in certain applications and work environments. Also, during assembly, the sealing layer is known to peel away from the brake shoe before the friction brake lining is secured.

As such, there is a need for an improved vehicle brake shoe, and a process for making such shoes, that addresses the drawbacks of known brake shoe construction, including those listed above.

SUMMARY

The above-listed need is met or exceeded by the present process for adhering brake pads to brake shoes, which features heat bonding of an adhesive to an exterior, convex surface of the brake shoe table. After preferably using an assembly fixture to properly align a dual-sided adhesive sheet upon the brake table, the sheet and the brake shoe are placed in an oven heated to 125-175° F. for between 60-105 minutes. A preferred temperature is 130° F. for 60 minutes. After removal from the oven, the remaining release layer is removed from the brake shoe, leaving the bonded adhesive. Next, brake pads or linings are fastened to the brake shoe using fasteners in a typical manner, however the bonded adhesive joins the pads to the brake shoe more securely and with an improved sealing action that prevents corrosion after long-term use in harsh work environments.

More specifically, a process for assembling vehicle brake shoes, includes providing a painted vehicle brake shoe with a table constructed and arranged for receiving a brake friction liner; applying a layer of self-adhesive material to the brake shoe table; subjecting the brake shoe and layer of material to heat sufficient in intensity and duration to thermally bond the self-adhesive material to the brake shoe table; removing a release layer from an external surface of the layer of self-adhesive material; applying a brake lining to the combined brake shoe and self-adhesive material; and fastening the brake lining to the brake shoe.

In an embodiment, the brake shoe and self-adhesive material is subjected to heat in the range of 125-175° F. It is contemplated that the brake shoe and self-adhesive material is subjected to the heat for a time period between 60-105 minutes. In an embodiment, the brake shoe and self-adhesive material is subjected to heat of 130° F. for a time period of 60 minutes.

It is preferred that the brake shoe is one of newly manufactured and remanufactured, and in some cases, the brake shoe is painted using electrostatic or other types of powder coating. It is also contemplated that the brake shoe is painted with water based paint, also known as "wet coated", or other coating processes known in the art.

In an embodiment, the step of applying the layer of self-adhesive material to the brake shoe table is performed using the adhesive sheet configured as a double-sided adhesive film or strip typically cut from a roll in a length approximately equal to a length of the brake shoe table, and has a pair of adhesive faces to which peelable backing layers are applied to protect the adhesive when not in use; an assembly fixture is used for facilitating aligned assembly of the adhesive sheet and includes a generally flat base and a pair of spaced, generally parallel, vertically projecting walls creating an application zone dimensioned to closely accommodate the brake shoe table; the adhesive sheet is placed in the application zone with one of the adhesive faces facing upwards; the brake shoe is placed above the sheet with the brake shoe table facing down to engage the adhesive face; and the brake shoe is lowered into the fixture between the walls and engages the face in a rocking motion so that the sheet is securely attached to the table.

In an embodiment, the brake lining is secured to the brake shoe by rivets. Also, a brake shoe is provided, produced according to the process described above.

DETAILED DESCRIPTION

Figure 1:
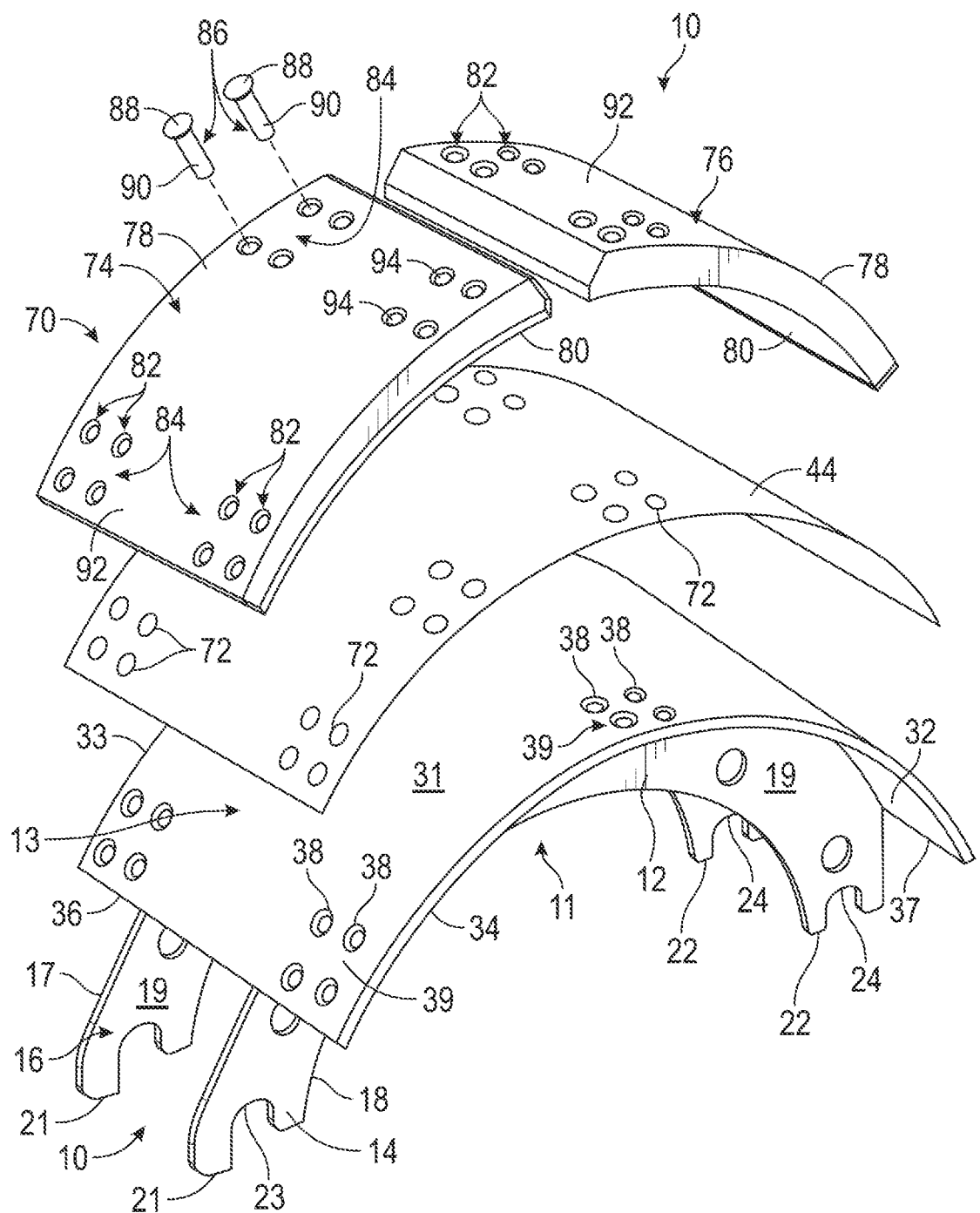
FIG. 1 is an exploded perspective view of a prior art brake shoe assembly.

Referring now to FIG. 1, a conventional brake assembly with a sealing liner for vehicles such as automobiles and trucks is generally designated 10. As is well known in the art, the brake assembly 10 is configured for use with drum-type vehicle brakes (not shown), and in particular such brakes as used on heavy duty vehicles, including commercial trucks. Included in the assembly 10 is an arcuate shaped brake shoe 11. The brake shoe 11 includes a semicircular web 12 and a curved brake shoe table 13 mounted over the web in an overlapping relationship. As FIG. 1 illustrates, the web 12 typically includes a pair of arcuately shaped struts or runners 14 and 16, although it will be understood that a single strut can be used to form the web. Each strut 14 and 16 is formed from a high strength metal such as a high tensile strength steel. Each strut 14, 16 has a curved outer convex edge 17, a curved inner concave edge 18, substantially flat side surfaces 19, and first and second ends 21 and 22. Each strut 14, 16 is curved about a predefined radius as desired to fit the desired braking assembly.

Substantially semicircular notches 23 and 24 are formed at the first and second ends respectively of the struts 14 and 16 for engaging the anchor pin and roller of a braking assembly (not shown) and for rotatably securing the brake shoes to the anchor pins.

As illustrated in FIG. 1, the brake shoe table 13 is securely mounted to the outer convex edges 17 of the struts 14 and 16 of the web 12 of the brake shoe 11 as by welding. Other fastening technologies known in the art are also contemplated. The brake shoe table 13 is a generally rectangularly shaped plate formed from the same high tensile strength steel or similar high strength metal as the struts 14, 16 of the web 12. The brake shoe table 13 is curved about a radius that corresponds approximately to the radius of the web 12 of the brake shoe 11 and to an inside surface of the brake drum. The brake shoe table 13 includes a convex surface 31 that faces away from the web 12, a concave surface 32 that extends parallel and is attached to the convex outer edges 17 of the struts 14 and 16 of the web, and a series of side edges 33, 34, 36, and 37, at the periphery of the brake shoe table. As illustrated in FIG. 1, the brake shoe table 13 is positioned over the convex outer edges 17 of the struts 14 and 16, with the struts 14 and 16 spaced apart from each other and with side edges 33 and 34 of the brake shoe table substantially overlapping the convex edges of the struts in a substantially T-shaped configuration as viewed from an end of the assembly 10.

A plurality of fastener openings 38 are formed through the brake shoe table 13 adjacent the side edges 33, 34, 36, and 37 for the insertion of fasteners therethrough. In the preferred embodiment, the fastener openings 38 are generally cylindrically shaped bores arranged in groups 39, here illustrated as being groups of four fastener openings. It will, however, be understood that while the groups 39 of four fastener openings 38 are illustrated, groups of greater or lesser numbers of fastener openings, i.e. two fastener openings, are also contemplated.

As FIG. 1 illustrates, an adhesive sheet 44 is applied to the convex surface 31 of the brake shoe table 13. The adhesive sheet 44 typically is a thin film or layer having a thickness of approximately five millimeters and having a substantially rectangular shape and size approximately corresponding to the shape and size of the brake shoe table 13.

In the preferred embodiment, the adhesive sheet 44 is a high-temperature adhesive generally composed of an acrylic/polymer material or a urethane base adhesive material. Further, the adhesive sheet 44 is designed to function as a sealing liner or membrane to provide a relatively strong adhesive bond under both severe shear and pull conditions created during braking. The adhesive material of the adhesive sheet 44 generally remains sufficiently fluid over a wide range of temperatures of approximately −50° F. up to approximately 800° F. without deteriorating to enable the adhesive to flow or spread as pressure is applied. As discussed above, in practice, the sealing layer has been found to break down in certain applications and work environments. Also, during assembly, the sealing layer is known to peel away from the brake shoe before the friction brake lining is secured.

Figure 2A:
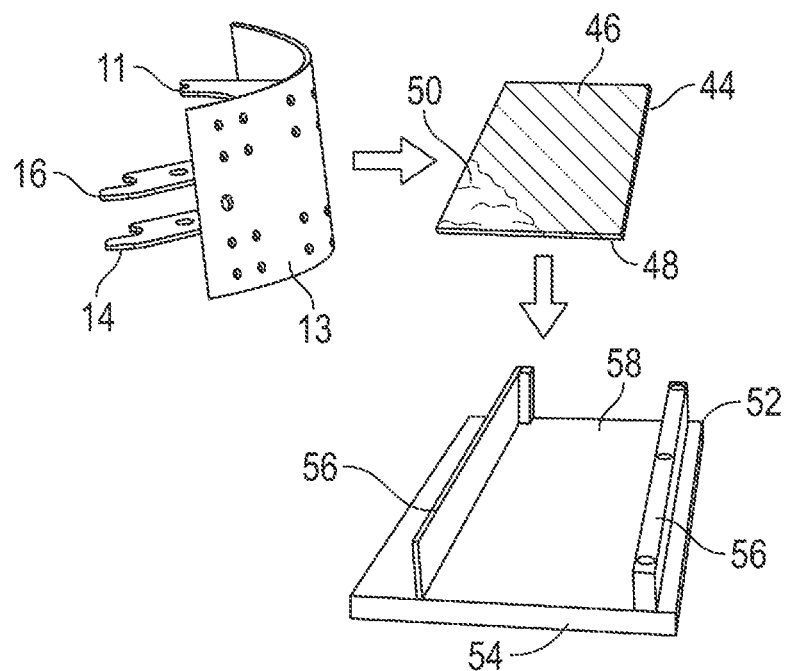
FIG. 2A is an exploded top perspective view of an assembly fixture for performing part of the present process and a sample brake shoe and seal layer.
Figure 2B:
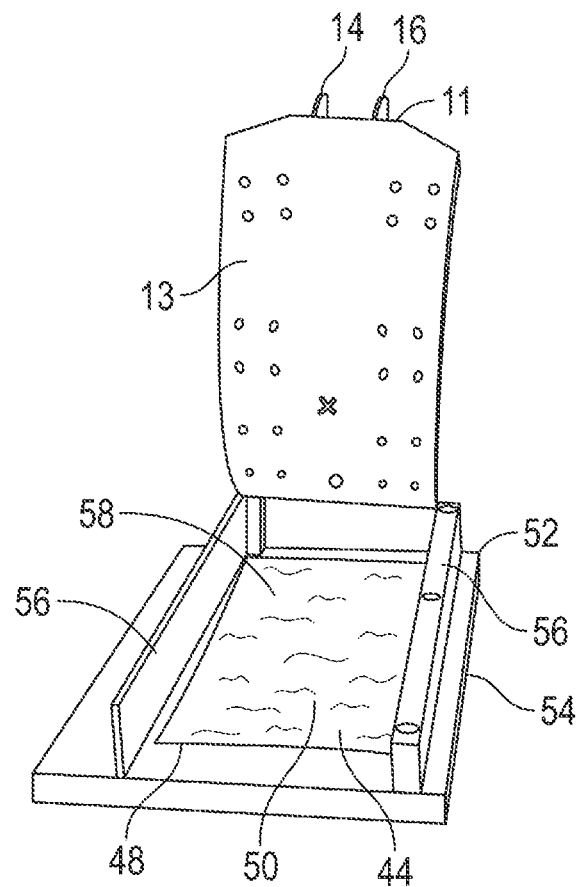
FIG. 2B is a top perspective view of the assembly fixture of FIG. 2A having the brake shoe about to have the seal layer attached.

Referring now to FIGS. 2A and 2B, an improved method is depicted for producing brake shoes that results in an improved brake shoe that features enhanced durability and resistance to corrosion, compared to prior art brake shoes. Initially, the adhesive that is used to hold a brake pad or liner to the brake shoe table 13 is provided as an adhesive sheet 44 as a double-sided adhesive film or strip typically cut from a roll in a length approximately equal to the length of the brake shoe table 13, and has a pair of adhesive faces to which peelable backing or release layers 46 and 48 are applied to protect the adhesive when not in use. When the adhesive is referred to as a sheet, it includes the release or backing layers. A first one of the backing layers 46 is peeled away to reveal an adhesive face 50 for application of the adhesive sheet to the brake shoe table 13.

As seen in FIG. 2A, an assembly jig or fixture 52 is used in the present process for facilitating aligned assembly of the adhesive sheet 44. Included on the fixture 52 is a generally flat base 54 and a pair of spaced, generally parallel, vertically projecting walls 56 that create an application zone 58 dimensioned to closely accommodate the brake shoe table 13. In some embodiments, at least one of the walls 56 is laterally adjustable on the base 54 to accommodate different sizes of sheets 44.

As seen in FIG. 2B, the adhesive sheet 44 is placed in the application zone 58 with the adhesive face 50 facing upwards. Next, the brake shoe 11 is placed above the sheet 44 with the brake shoe table 13 facing down to engage the adhesive face 50.

It is preferred that the brake shoe 11 is one of newly manufactured and remanufactured, and in some cases, the brake shoe is painted using electrostatic or other types of powder coating. It is also contemplated that the brake shoe is painted with water based paint, also known as "wet coated", or other coatings known in the art. The brake shoe 11 is lowered into the fixture 52 between the walls 56 and engages the face 50 in a rocking motion so that the sheet 44 is securely attached to, and accurately aligned with, the table 13.

Figure 3:
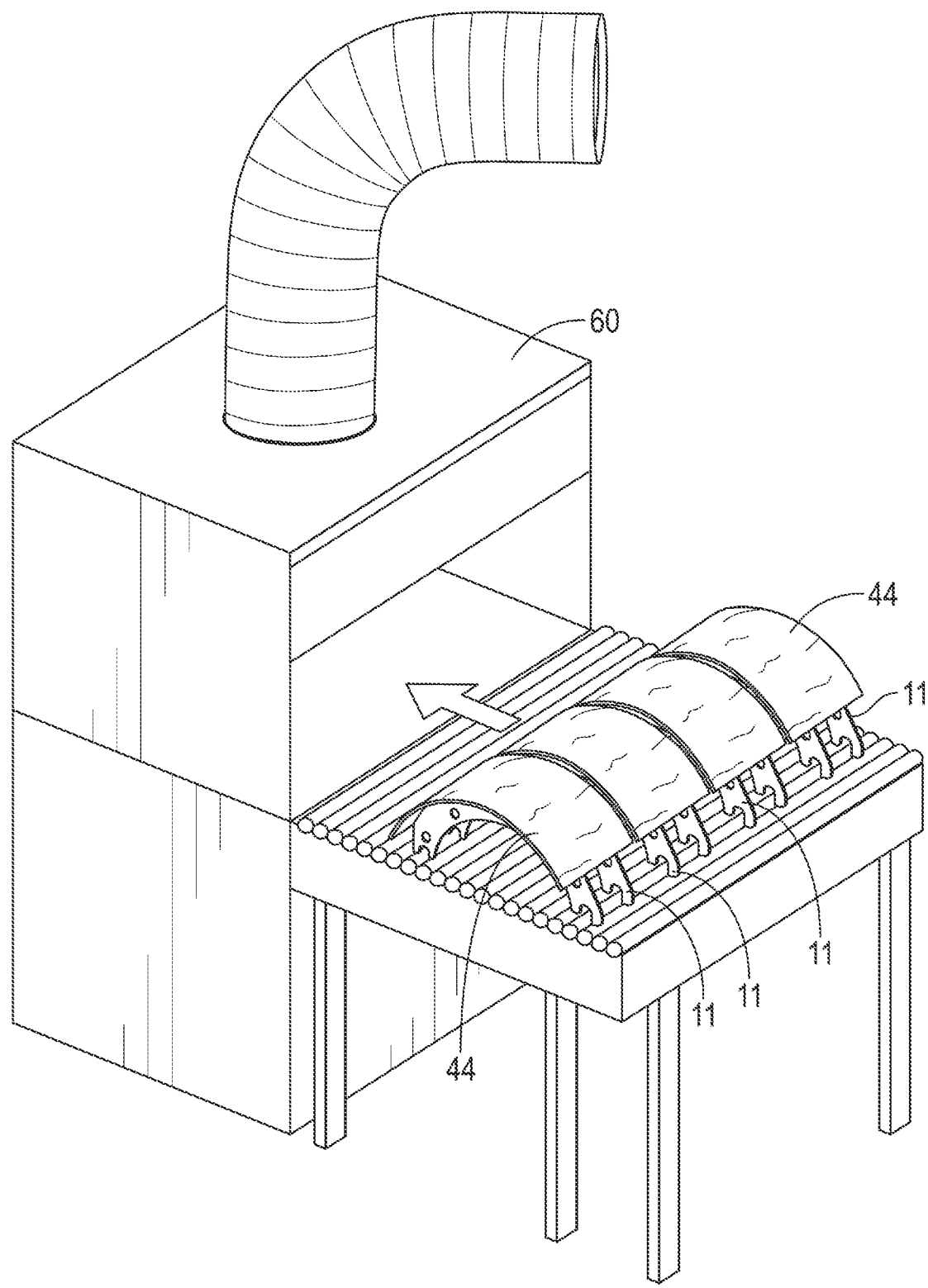
FIG. 3 is a perspective view of a step of the present process, where a plurality of brake shoes with the layer of adhesive is placed in an oven for heat treatment.

Referring now to FIG. 3, at least one brake shoe 11 with the adhesive sheet 44 attached in place as described above is placed in an oven 60 and exposed to at least 125-175° F. for 60-105 minutes. A preferred heating arrangement is 130° F. for 60 minutes. However, other heating scenarios are contemplated depending on the application. During this heating process, the adhesive from the face 50 melts and bonds to the brake shoe table 13. It has been found that by placing the brake shoe and adhesive sheet in the oven 60 as described, the adhesive is prevented from peeling off when removing the release layer 48 to apply the brake shoe or liner as described below.

Figure 4:
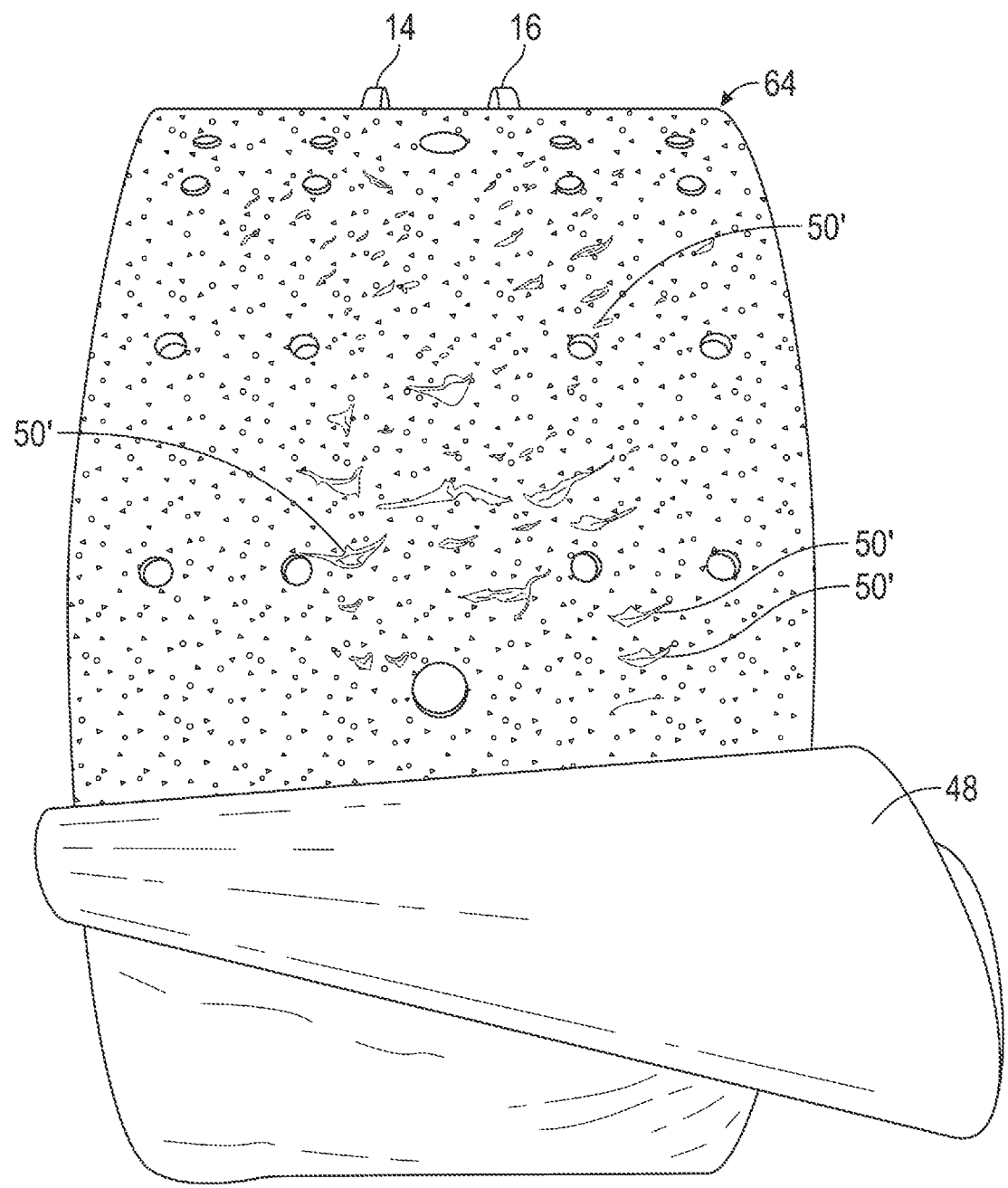
FIG. 4 is a front perspective view of the present brake shoe after exiting the oven, and having the release layer partially removed from the adhesive.

Referring now to FIG. 4, a brake shoe 64 produced according to the present process is depicted. Components shared with the brake shoe 11 are designated with identical reference numbers. At this time, upon removal of the brake shoes 11 from the oven 60, the other peelable backing layer 48 is removed, exposing the adhesive After the exposed surface 50 of the adhesive sheet 44 has been applied and heat bonded to the brake shoe table 13, adhesive 50' from the adhesive layer 50 is now bonded to the brake shoe is coating the brake shoe table. While tufts of the adhesive are more visible and are designated in FIG. 4, it is to be noted that the entire surface of the shoe table 13 is coated with adhesive.

Figure 5:
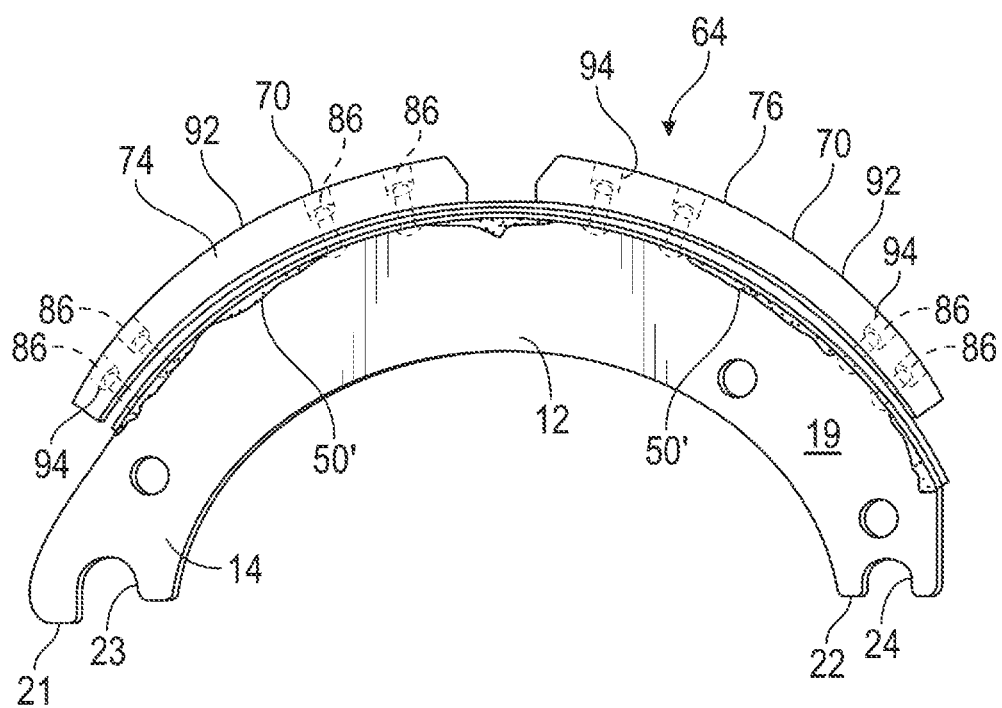
FIG. 5 is a side elevation of the present assembled brake shoe.

Referring now to FIG. 5, a friction liner 70 (FIG. 1) is applied to the adhesive 50' and is mounted to the brake shoe table 13. As also shown in FIG. 1, in the prior art device, a series of openings 72 are formed in the adhesive sheet 44 and are aligned with the fastener openings 38 of the brake shoe table 13. This part of the liner attachment procedure is eliminated by the present process, in which the adhesive 50' is heat bonded to the brake shoe table 13. The friction brake liner 70 generally includes a pair of brake pads 74 and 76, although it will be understood by those skilled in the art that several smaller brake pads or a single brake pad of approximately double the size of one of the brake pads is contemplated.

Each brake pad 74, 76 is a substantially rectangularly shaped block formed from a frictional material such as steel wool or a similar metal alloy material. Further, each brake pad 74, 76 includes a convex outer surface 78 for engaging a confronting surface of a rotary brake drum (not shown), and a concave inner surface 80 which faces and mates with the convex surface 31 of the brake shoe table 13 in a tight seated engagement with the bonded adhesive 50' sandwiched therebetween.

A series of fastener openings 82 (FIG. 1) are formed through the brake pads 74, 76, and preferably are generally cylindrically shaped bores arranged in groups 84 with the number of fastener openings of each group corresponding to the number of fastener openings in each group 39 formed through the brake shoe table 13, and are aligned with the fastener openings 38 formed through the brake shoe table.

Referring again to FIGS. 1 and 5, a series of fasteners 86 are inserted through each of the aligned fastener openings 82 and 38 of the brake pads 74, 76 and the brake shoe table 13, respectively, to secure the brake pads to the brake shoe table. The fasteners 86 typically are rivets or bolts, although other conventional fastening means also can be used. Each fastener 86 preferably includes a head portion 88 and a depending shank portion 90. To facilitate a flush mounting of the fasteners 86 with a brake pad exterior 92, the openings 82 are preferably countersunk, at 94 As is known in the art, the fasteners 86 are secured in place so that the brake pads 74, 76 are secured to the brake shoe table 13 with the bonded adhesive 50' supplementing the adhesive function of the fasteners, and also providing a more effective seal than was provided by the prior art configuration. As seen in FIG. 5, after assembly of the brake shoe 64, it is not uncommon for some of the bonded adhesive 50' to seep from the sides of the brake pads 74, 76 and the brake shoe table 13.

While a particular embodiment of the present process for assembling vehicle brake shoes and associated brake shoe has been described herein, it will be appreciated by those skilled in the art that changes and modifications may be made thereto without departing from the invention in its broader aspects and as set forth in the following claims.

The invention claimed is:

1. A process for assembling vehicle brake shoes, comprising:
    providing a painted vehicle brake shoe with a table constructed and arranged for receiving a brake friction liner;
    applying a layer of self-adhesive material to the brake shoe table;
    subjecting the brake shoe and layer of material to heat sufficient in intensity and duration to thermally bond the self-adhesive material to the brake shoe table;
    removing a release layer from an external surface of the layer of self-adhesive material;
    applying a brake lining to the combined brake shoe and self-adhesive material; and
    fastening the brake lining to the brake shoe.

2. The process of claim 1, wherein the brake shoe and self-adhesive material is subjected to heat in the range of 125-175° F.

3. The process of claim 2, wherein the brake shoe and self-adhesive material is subjected to the heat for a time period between 60-105 minutes.

4. The process of claim 1, wherein the brake shoe and self-adhesive material is subjected to heat at 130° F. for a time period of 60 minutes.

5. The process of claim 1, wherein the brake shoe is one of newly manufactured and remanufactured.

6. The process of claim 1, wherein the brake shoe is painted using electrostatic powder coating.

7. The process of claim 1, wherein said step of applying the layer of self-adhesive material to the brake shoe table is performed using an adhesive sheet configured as a double-sided adhesive film or strip typically cut from a roll in a length approximately equal to a length of the brake shoe table, and has a pair of adhesive faces to which peelable backing layers are applied to protect the adhesive when not in use;
    an assembly fixture is used for facilitating aligned assembly of the adhesive sheet and includes a generally flat base and a pair of spaced, generally parallel, vertically projecting walls creating an application zone dimensioned to closely accommodate the brake shoe table;
    the adhesive sheet is placed in the application zone with one of the adhesive faces facing upwards;
    the brake shoe is placed above the sheet with the brake shoe table facing down to engage the adhesive face; and
    the brake shoe is lowered into the fixture between the walls and engages the face in a rocking motion so that the sheet is securely attached to the table.

8. The process of claim 1, wherein said brake lining is secured to said brake shoe by rivets.

9. A brake shoe produced according to the process of claim 1.

\* \* \* \* \*